United States Patent
Morris et al.

(10) Patent No.: US 8,385,698 B2
(45) Date of Patent: Feb. 26, 2013

(54) CONTROLLABLE OPTICAL RING RESONATOR HAVING PERIODICALLY SPACED CONTROL ELECTRODES

(75) Inventors: Terrel L. Morris, Garland, TX (US); Michael R. Tan, Menlo Park, CA (US); Wei Wu, Palo Alto, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 12/743,740

(22) PCT Filed: Dec. 12, 2007

(86) PCT No.: PCT/US2007/087307
§ 371 (c)(1),
(2), (4) Date: May 19, 2010

(87) PCT Pub. No.: WO2009/075684
PCT Pub. Date: Jun. 18, 2009

(65) Prior Publication Data
US 2010/0266233 A1    Oct. 21, 2010

(51) Int. Cl.
*G02F 1/035* (2006.01)
*G02B 6/26* (2006.01)
*G02B 6/42* (2006.01)
*H01S 3/11* (2006.01)
*H01S 3/083* (2006.01)
*G03B 21/60* (2006.01)

(52) U.S. Cl. .......... 385/40; 385/1; 385/2; 385/31; 385/50; 372/10; 372/94; 359/459

(58) Field of Classification Search .......... None
See application file for complete search history.

(56) References Cited

U.S. PATENT DOCUMENTS

| | | | |
|---|---|---|---|
| 6,389,197 B1 | 5/2002 | Iltchenko | |
| 6,631,002 B1 * | 10/2003 | Numai | 356/461 |
| 6,665,330 B1 | 12/2003 | Numai | |
| 6,795,481 B2 | 9/2004 | Maleki | |
| 6,920,253 B2 | 7/2005 | Tan | |
| 6,970,619 B2 | 11/2005 | Baumann | |
| 7,019,847 B1 | 3/2006 | Bearman | |
| 7,054,009 B2 | 5/2006 | DePue | |
| 7,072,531 B2 | 7/2006 | Djordjev | |
| 7,251,408 B1 | 7/2007 | Gunn, II | |

(Continued)

FOREIGN PATENT DOCUMENTS
JP        6252476 A       9/1994
WO   WO 2009075684 A1 *   6/2009

OTHER PUBLICATIONS

P. Dong, "All-optical compact silicon comb switch," Optics Express, vol. 15, No. 15, Jul. 2007, pp. 9600-9605.

(Continued)

*Primary Examiner* — Rhonda Peace

(57) ABSTRACT

A controllable optical ring resonator, a photonic system and a method of controlling an optical ring resonator employ control electrodes periodically spaced apart along a closed loop optical path of an optical waveguide. The controllable optical ring resonator includes the optical waveguide and a plurality of the periodically spaced control electrodes. The photonic system includes an input optical waveguide segment and the controllable optical ring resonator adjacent and optically coupled to the segment. The method includes providing the plurality of periodically spaced control electrodes, providing an optical signal within the optical path, and addressing one or more of the control electrodes to interact with the optical signal within the optical path.

20 Claims, 6 Drawing Sheets

U.S. PATENT DOCUMENTS

| | | | |
|---|---|---|---|
| 7,564,563 B2* | 7/2009 | Yokouchi et al. | 356/461 |
| 7,656,928 B2* | 2/2010 | Furuyama | 372/94 |
| 2005/0074194 A1* | 4/2005 | Tan et al. | 385/1 |
| 2005/0074200 A1* | 4/2005 | Savchenkov et al. | 385/15 |
| 2006/0056760 A1* | 3/2006 | Djordjev et al. | 385/15 |
| 2007/0035800 A1 | 2/2007 | Hochberg | |
| 2007/0291273 A1* | 12/2007 | Yokouchi et al. | 356/459 |
| 2008/0165809 A1* | 7/2008 | Furuyama | 372/10 |
| 2009/0162010 A1* | 6/2009 | Wu et al. | 385/31 |
| 2010/0098129 A1* | 4/2010 | Furuyama | 372/94 |
| 2010/0266233 A1* | 10/2010 | Morris et al. | 385/2 |

OTHER PUBLICATIONS

Martin, T.S. et al. 'Electronically tunable and switchable filters using microstrip ring resonator circuits.' In: Microwave Symposium Digest. New York: IEEE MTT-S International, May 25-27, 1988, vol. 2, pp. 803-806.

ISA International Search Report and Written Opinion (PCT/US07/87307).

R. Grover et al., "III-V Semiconductor Optical Micro-Ring Resonators," AIP Conf. Proc., May 2004, vol. 709, pp. 110-129.

M. Lipson, "Compact Electro-optic Modulators on a Silicon Chip," IEEE J. Sel. Topics Quantum Electron., vol. 12, No. 6, Nov./Dec. 2006, pp. 1520-1526.

Q. Xu et al., "Carrier-induced optical bistability in silicon ring," Optics Letters, vol. 31, No. 3, Feb. 2006, pp. 341-343.

Q. Xu et al., "Cascaded silicon micro-ring modulators for WDM optical interconnection," Optics Express, vol. 14, No. 20, Oct. 2006, pp. 9430-9435.

* cited by examiner

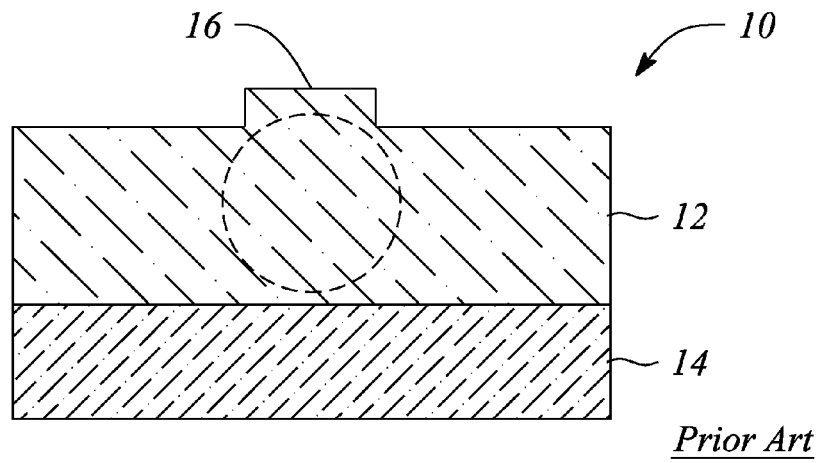
FIG. 1A  *Prior Art*
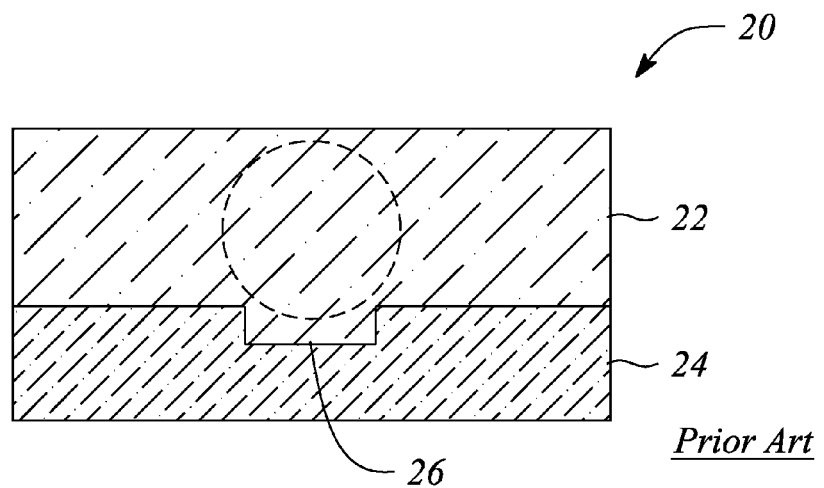
FIG. 1B  *Prior Art*
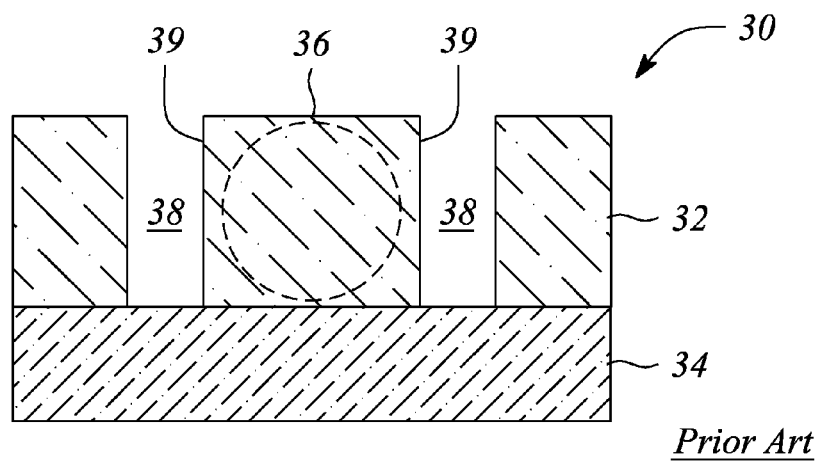
FIG. 1C  *Prior Art*

CONTROLLABLE OPTICAL RING RESONATOR HAVING PERIODICALLY SPACED CONTROL ELECTRODES

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to optical waveguides and photonic circuits. In particular, the invention relates to optical waveguide ring resonators used in photonic systems.

2. Description of Related Art

An optical ring resonator generally comprises a segment or segments of optical waveguide arranged as a ring-shaped, closed loop. Such optical ring resonators have a variety of important uses in photonic systems. For example, the optical ring resonator may be part of a photonic filter. In another example, the optical ring resonator may be employed as an element in a photonic frequency multiplexer used to select a particular frequency portion of an input optical signal. The frequency multiplexer may further route the selected frequency portion along an optical path that differs from that of the input optical signal. If the optical ring resonator is rendered controllable, the photonic frequency multiplexer may be employed as an optical switch, for example. In another example, one or more controllable optical ring resonators also may be used adjust a performance of the photonic filter.

An optical ring resonator may be rendered controllable by adding a control electrode to an optical path within the resonator. The control electrode, when activated, acts to change a refractive index of a material of the optical waveguide in a vicinity of the control electrode. The change in refractive index interferes with or disrupts a resonance of the optical ring resonator. In particular, the activation of the control electrode may prevent an optical signal from being coupled into and resonating within the optical ring resonator. Thus, the control electrode essentially allows the optical ring resonator to be turned 'ON' and turned 'OFF' according to an input that controls the control electrode.

To be effective for such ON/OFF control, the control electrode must generally be relatively large. In particular, the control electrode typically encompasses a significant portion or length of the optical path within the optical ring resonator. Unfortunately, such relatively large control electrodes exhibit a relatively large capacitance. The relatively large capacitance of such control electrodes can and does adversely affect a performance of the controllable optical ring resonator. For example, the relatively large capacitance may limit an upper frequency of the controllability of the optical ring resonator. In addition, large control electrodes may interfere with an optical field of the optical signal resulting in an increased optical loss in the optical path. The increased optical loss may be particularly pronounced if the electrodes comprise a metal. Moreover, the large control electrode provides little or no control flexibility.

BRIEF SUMMARY

In some embodiments of the present invention, a controllable optical ring resonator is provided. The controllable optical ring resonator comprises an optical waveguide having an optical path in a closed loop. The controllable optical ring resonator further comprises a plurality of control electrodes. The control electrodes are periodically located and spaced apart from one another along the optical waveguide. The control electrodes control an optical signal within the optical path of the optical waveguide.

In other embodiments of the present invention, a photonic system is provided. The photonic system comprises an input optical waveguide segment; and a controllable optical ring resonator adjacent and optically coupled to the input optical waveguide segment. The controllable optical ring resonator comprises an optical waveguide forming a closed optical path and a plurality of control electrodes. The control electrodes are periodically located and spaced apart from one another along the optical waveguide. The control electrodes control an optical signal that resonates within the controllable optical ring resonator. The optical signal is coupled one or both of from and to the input optical waveguide.

In other embodiments of the present invention, a method of controlling an optical ring resonator is provided. The method of controlling the optical ring resonator comprises providing a plurality of control electrodes periodically spaced along an optical path of the optical ring resonator. The method of controlling further comprises providing an optical signal within the optical path of the optical ring resonator; and addressing one or more of the control electrodes. An addressed control electrode interacts with the optical signal within the optical path.

Certain embodiments of the present invention have other features that are one or both of in addition to and in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which:

FIG. 1A illustrates a cross sectional view of an exemplary conventional slab optical waveguide known as a ridge-loaded optical waveguide.

FIG. 1B illustrates a cross sectional view of another exemplary conventional slab optical waveguide known as a reverse ridge-loaded waveguide.

FIG. 1C illustrates a cross sectional view of an exemplary conventional strip optical waveguide.

DETAILED DESCRIPTION

Figure 2:
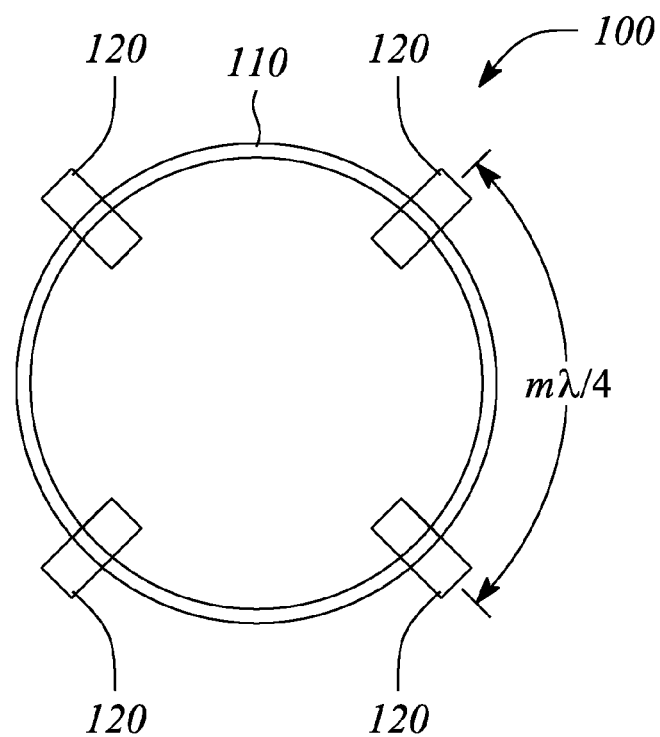
FIG. 2 illustrates a top view of a controllable optical ring resonator according to an embodiment of the present invention.

Embodiments of the present invention employ a plurality of control electrodes to control a performance of an optical ring resonator. The individual control electrodes of the plurality are periodically spaced around the optical ring resonator. In particular, the optical ring resonator according to various embodiments is a closed loop, ring-shaped resonant structure that supports a resonant optical signal within the closed loop. The plurality of periodically spaced control electrodes controls a resonance characteristic of the optical ring resonator, such that the optical ring resonator is controllable. Specifically, operation of the control electrodes interacts with the optical signal and results in effects on the overall resonance performance of the optical ring resonator. As such, various embodiments of the present invention essentially provide a controllable optical ring resonator.

In various embodiments, the plurality of periodically spaced control electrodes may exhibit a lower overall control capacitance than that provided by a single relatively larger control electrode. A lower overall control capacitance may facilitate higher control frequencies. Furthermore, the plurality of periodically spaced control electrodes generally present less potential for interference to the resonant optical signal. Moreover, the plurality of periodically spaced control electrodes facilitates control flexibility. Control flexibility relates to frequency modes of the controllable optical ring resonator including, but not limited to, control-induced mode locking. Such control-induced mode locking is not generally possible when a single control electrode is employed to control a ring resonator.

The controllable optical ring resonator according to various embodiments of the present invention may be realized in a relatively compact and space-efficient form factor. Moreover, the controllable optical ring resonator may be readily fabricated in an integrated form as part of a larger circuit or subsystem. In particular, the controllable optical ring resonator is well-suited to fabrication on or in a substrate such as, but not limited to, a multilayer semiconductor substrate, according to various embodiments of the present invention. Fabrication on or in the substrate facilitates integrating the controllable optical ring resonator with other photonic and non-photonic components including, but not limited to, one or more of passive photonic components, active photonic components, passive electronic components and active electronic components.

For example, the controllable optical ring resonator may be fabricated directly in a surface layer (e.g., a thin film semiconductor layer) of a semiconductor-on-insulator (SOI) substrate. The surface layer may be a single-crystal silicon, an amorphous silicon, or a polysilicon thin film layer of a silicon-on-insulator substrate, for example. Other photonic components similarly may be fabricated on or in the same semiconductor substrate and integrated with the controllable optical ring resonator, according to some embodiments of the present invention. Such photonic components that may be integrated with the controllable optical ring resonator include, but are not limited to, optical signal transmission structures (e.g., other optical waveguides), optical amplifiers, optical switches and optical modulators.

According to some embodiments of the present invention, the controllable optical ring resonator of the present invention employs a slab optical waveguide. Employing a slab optical waveguide facilitates realizing a resonant structure embodied by the optical ring resonator that exhibits relatively low optical loss. In some embodiments, the slab optical waveguide comprises a ridge-loaded optical waveguide. According to other embodiments, the slab optical waveguide comprises an inverted or reverse ridge-loaded optical waveguide. In yet other embodiments of the present invention, the controllable optical ring resonator employs other optical waveguides besides a slab optical waveguide. Such essentially 'non-slab' type optical waveguides may include, but are not limited to, a strip optical waveguide and a low-index' or 'slot' optical waveguide.

As used herein, 'slab optical waveguide' refers to an optical waveguide in which the propagating optical signal is confined to and propagates within a slab or sheet of dielectric material. As such, the slab optical waveguide is a member of the class of dielectric waveguides. The slab optical waveguide is also referred to as simply a 'slab waveguide' herein.

In some embodiments, a thickness of the slab waveguide is selected to preferentially sustain a lower order propagating mode of the optical signal. For example, the thickness may be less than a particular thickness such that only a first transverse electric mode (i.e., $TE_{10}$) can propagate. The particular thickness depends on a refractive index of a material of the slab waveguide as well as specific physical characteristics of the slab waveguide (i.e., optical waveguide type). Design guidelines and equations are readily available for establishing the particular thickness for a given refractive index and optical waveguide type.

FIG. 1A illustrates a cross sectional view of a conventional slab optical waveguide known as a ridge-loaded optical waveguide 10. The ridge-loaded optical waveguide 10 is also sometimes referred to as a 'ridge-loaded waveguide' or simply a 'ridge waveguide'. The ridge-loaded waveguide comprises a slab layer 12. In some embodiments, the slab layer 12 may comprise a thin film layer deposited on an underlying layer or an underlying supporting substrate (not illustrated). In such embodiments, the ridge-loaded waveguide 10 may be termed a 'thin film' ridge-loaded wave guide 10.

The slab layer 12 comprises a dielectric material through which an optical signal propagates and is guided within the ridge-loaded waveguide 10. In particular, essentially all of the energy of the optical signal is confined to the slab layer 12. In general, the slab layer 12 comprises a dielectric material or a semiconductor material, which behaves essentially as a dielectric material with respect to its use in an optical waveguide. Moreover, the material of the slab layer 12 is essentially transparent to the optical signal.

For example, the slab layer 12 may comprise a semiconductor material that is compatible with the optical signal such as, but not limited to, silicon (Si), gallium arsenide (GaAs), gallium aluminum arsenide (GaAlAs), indium phosphide (InP), tin oxide (SnO), and lithium niobate (LiNbO$_3$). Essentially any of a single crystalline, polycrystalline or amorphous layer of the semiconductor material may be employed, according to various embodiments. The transparency of the slab layer material affects an optical loss of the ridge-loaded waveguide. For example, the less transparent the material, the more loss is experienced by the optical signal.

In some embodiments of the ridge waveguide 10, the slab layer 12 is supported by a support layer 14. The support layer 14 physically supports the slab layer 12. In some embodiments, the support layer 14 also facilitates optical confinement in the slab layer 12. In some embodiments of the ridge waveguide 10, the support layer 14 may comprise a material that differs from the material of the slab layer 12. In particular, the support layer 14 may comprise a material having a refractive index that is different from a refractive index of the slab layer 12. For example, the support layer 14 may be an oxide-based insulator layer (e.g., a silicon oxide). In another example, the support layer 14 is an insulator layer of an SOI substrate. In some embodiments of the ridge waveguide 10, the different refractive index of the support layer 14 serves to essentially confine the optical signal to the slab layer 12.

The ridge-loaded waveguide 10 further comprises a ridge 16. The ridge 16 is located on and extends above a top surface of the slab layer 12. The ridge 16 serves to 'guide' the optical signal within the slab layer 12. In particular, essentially all of the optical energy of the optical signal is concentrated below but adjacent to the ridge 16 within the slab layer 12. For example, the optical signal may be essentially concentrated in a roughly circular region below the ridge 16, as illustrated by an exemplary dashed circle in FIG. 1A.

The ridge 16 may be formed by one or more of an etching process, a selective deposition process, or a printing process, for example. A particular width and height of the ridge 16 are generally a function of a refractive index of the slab layer 12 material. Information for determining the width and the height may be readily obtained from conventional design guidelines and using computer design models for ridge-loaded optical waveguides.

FIG. 1B illustrates a cross sectional view of another conventional slab waveguide known as a reverse ridge-loaded optical waveguide 20. The reverse ridge-loaded optical waveguide 20 is also referred to simply as a 'reverse ridge-loaded waveguide' or a 'reverse ridge waveguide' herein.

The reverse ridge-loaded waveguide 20 comprises a slab layer 22. The reverse ridge-loaded waveguide 20 further comprises a support layer 24. The support layer 24 comprises a material having a refractive index that differs from a refractive index of the slab layer 22. The slab layer 22 is essentially similar to the slab layer 12 of the ridge-loaded waveguide 10 described above, according to some embodiments of the reverse-ridge waveguide 20. Further, the support layer 24 may be essentially similar to the support layer 14 of the ridge-loaded waveguide 10 described above, according to some embodiments of the reverse-ridge waveguide 20. In some embodiments of the reverse-ridge waveguide 20, the slab layer 22 comprises a thin film layer deposited on the support layer 24, wherein the support layer 24 is lying on a supporting substrate (not illustrated). In such embodiments, the reverse ridge-loaded waveguide 20 may be termed a 'thin film' reverse ridge-loaded wave guide 20.

The reverse ridge-loaded waveguide 20 further comprises a ridge 26. The ridge 26 extends from an interface between the support layer 24 and the slab layer 22 down and into the support layer 24. As with the ridge 16 of the ridge-loaded waveguide 10 described above, the ridge 26 of the reverse ridge-loaded waveguide 20 serves to guide the optical signal within the slab layer 22. An exemplary dashed circle above but adjacent to the ridge 26 illustrates an approximate extent of the optical signal energy associated with the optical signal propagating in the reverse ridge-loaded waveguide 20, by way of example.

FIG. 1C illustrates a cross sectional view of an exemplary conventional strip optical waveguide 30. The strip optical waveguide 30, or simply 'strip waveguide', comprises a strip layer 32 and a support layer 34. The strip optical waveguide 30 further comprises a strip 36 formed in or from the strip layer 32. In some embodiments of the strip waveguide 30, the strip 36 may be formed in the strip layer 32 by etching channels 38 to define the strip 36, as illustrated in FIG. 1C. The channels 38 optically isolate the strip 36 from the strip layer 32. In other embodiments of the strip waveguide 30, the strip 36 comprises the entire strip layer 32 (not illustrated). For example, the strip layer 32 may be essentially removed by etching to leave only the strip 36 during fabrication. As such, channels are not formed.

In contrast to the slab waveguides 10, 20, the optical energy within the strip waveguide 30 is essentially confined to the strip 36 by the presence of sidewalls 39 of the strip 36. A material boundary exists at the sidewalls 39 between a material of the strip layer 32 and air or another dielectric material within the channels 38. The boundary represents a change in a refractive index across the boundary. The refractive index change causes an optical signal to be tightly bound to the strip 36 due to total internal reflection therewithin. A dashed circle within the strip 36 illustrates an approximate extent of the optical energy associated with the optical signal propagating in the strip waveguide 30, for example.

In other embodiments of the present invention, the controllable optical ring resonator employs a low-index optical waveguide (not illustrated). Herein, a 'low-index optical waveguide' is defined as an optical waveguide having a central region in which a refractive index is relatively lower than a refractive index of a surrounding region. The central region with the relatively lower index of refraction is referred to as a 'low index region'. A majority of an optical field propagating in the low-index optical waveguide is essentially confined to the low index region.

The low-index optical waveguide is distinguished from a conventional or high-index optical waveguide (e.g., a fiber optic waveguide) in that the high-index optical waveguide includes a guiding structure made exclusively of material having a higher refractive index than the surrounding material. In some exemplary embodiments, the low-index optical waveguide is a slot optical waveguide. In other exemplary embodiments, the low-index optical waveguide uses a photonic bandgap crystal adjacent to the low index region to confine the optical field propagating within the optical waveguide.

As used herein, 'slot optical waveguide' refers to a low-index optical waveguide, as defined herein, comprising a sub-micron, low refractive index slot bounded by a pair of walls having a relatively higher index of refraction. Specifically, the slot has a refractive index that is less than, and in some embodiments, much less than, a refractive index of a material of the walls. For example, a refractive index of the slot may be about 1.0 (e.g., air) while the walls may have a refractive index of about 3.6 (e.g., silicon). As such, the slot may be referred to as a 'low refractive index slot' or 'low-index' slot while the walls are often referred to as 'high refractive index walls' or 'high-index' walls. The slot optical waveguide is also referred to as simply a 'slot waveguide' herein. Furthermore, the slot waveguide is a representative embodiment of a low-index optical waveguide. As such, the terms 'slot waveguide' and 'low-index optical waveguide' are generally used interchangeably herein unless a distinction is necessary for proper understanding.

Operation of the slot optical waveguide may be understood as a mode construction of two 'high-index' optical waveguide modes of an optical signal propagating in the high refractive index walls that bound the low refractive index slot. In particular, a high contrast discontinuity in an electric field of the optical signal is created at an interface between the low refractive index slot and the high refractive index walls.

A quasi-transverse electric (TE) mode of the optical signal propagating through the slot optical waveguide structure experiences a discontinuity that is proportional to the square of the ratio of the high refractive index of the walls and the low refractive index of the slot. When a width of the slot is comparable to a decay length of the electric field, the high contrast discontinuity produces a relatively strong overlap of the two high-index waveguide modes within the slot. The strong overlap results in a power density of the field within the low refractive index slot that is relatively constant across the slot and that is much higher than the field within the high refractive index walls. As such, the optical signal is tightly confined to the slot of the slot waveguide. Moreover, the optical field intensity of the optical signal within the slot represents a high intensity region relative to the optical field intensity in an area surrounding the slot.

In various embodiments of the slot waveguide, a particular width of the slot depends, in part, on a refractive index of a material of the walls and a refractive index of the slot region of the slot waveguide. For example, a slot waveguide having walls comprising silicon (Si) and having a slot that is essentially filled with air or another relatively low refractive index material such as, but not limited to, silicon dioxide ($SiO_2$), may have a slot width on the order of about 50 nanometers (nm) to about 100 nm. Generally, a slot width of less than about 200 nm may be employed for a wide variety of practical materials. Additional details regarding slot optical waveguide design and operation are provide by Lipson et al., U.S. Patent Application Publication 2006/0228074 A1, and Barrios et al., U.S. Patent Application Publication 2007/0114628 A1, both of which are incorporated by reference herein.

As discussed above, the controllable optical ring resonator (hereinafter also referred to as 'optical resonator' for simplicity of discussion) comprises one or more segments of optical waveguide arranged in closed loop. Any of the above-described optical waveguide types may be employed as the segment(s) of optical waveguide, according to various embodiment of the optical resonator. In some embodiments of the optical resonator, a single segment of optical waveguide is bent to form the closed loop. In other embodiments, more than one segment is employed. In some of such embodiments, the optical resonator may be referred to as a 'folded cavity' resonator because mirrors are employed along (as opposed to at the ends of) an optical path within the optical resonator. In particular, mirrors may be employed to introduce an abrupt change in a direction of the propagating signal within the optical resonator. In other words, an optical path within the optical resonator is effectively 'folded' by a presence of the mirror. In some embodiments, the mirrors allow the optical resonator to be realized in a more compact and space-efficient shape than would be possible otherwise. Total internal reflection mirrors may be employed to realize the folded cavity of the optical resonator, according to some embodiments.

A total internal reflection mirror (TIR mirror) is defined as a mirror that reflects or changes a direction of an optical signal using total internal reflection. Total internal reflection is a well-known optical phenomenon. Total internal reflection of an optical signal traveling in a material occurs when the optical signal encounters a material boundary at an angle greater than a critical angle relative to a normal of the boundary. In particular, when the material boundary represents a change in refractive index from a higher refractive index to a lower refractive index, the optical signal beyond the critical angle will be essentially unable to penetrate the boundary and will be reflected away from the boundary. The reflection obeys the law of reflection in that a reflection angle equals an angle of incidence on the boundary. An example of a boundary that may provide total internal reflection and thus, be employed as a TIR mirror, is a boundary between a dielectric material (e.g., glass or silicon) and air.

The terms 'semiconductor' and 'semiconductor materials' as used herein independently include, but are not limited to, group IV, group III-V and group II-VI semiconductor materials from the Periodic Table of the Elements, including compound semiconductor materials, or another semiconductor material that forms any crystal orientation. For example, and not by way of limitation, a semiconductor substrate may be a silicon-on-insulator (SOI) wafer with a (111)-oriented silicon layer (i.e., top layer), or a single, free-standing wafer of (111) silicon, depending on the embodiment. The semiconductor materials that are rendered electrically conductive, according to some embodiments herein, are doped with a dopant material to impart a targeted amount of electrical conductivity (and possibly other characteristics).

An insulator or an insulator material useful for the various embodiments of the invention is any material that is capable of being made insulating including, but not limited to, a semiconductor material from the groups listed above, another semiconductor material, and an inherently insulating material. Moreover, the insulator material may be an oxide, a carbide, a nitride or an oxynitride of any of those semiconductor materials such that insulating properties of the material are facilitated. Alternatively, the insulator may comprise an oxide, a carbide, a nitride or an oxynitride of a metal (e.g., aluminum oxide) or even a combination of multiple, different insulating materials.

As used herein, 'control electrode' generally refers to and is defined as a means for adjusting a propagation characteristic of an optical waveguide as a result of the application of an electric bias or signal. The control electrode may influence a refractive index of the optical waveguide in a vicinity of the control electrode, for example. Various examples of control electrodes include, but are not limited to, semiconductor junctions that one or both of inject free carriers into an optical path of the optical waveguide and extract free carriers out of an optical path of the optical waveguide. For example, injection of free carriers may induce free carrier plasma dispersion resulting in a local change in the refractive index of a material of the optical path.

As used herein, 'periodically spaced' is defined as spacing that is a fraction (i.e., 1/n where n is an integer) of a total path length of the closed path within the controllable optical ring resonator, according to some embodiments. The total path length is generally a function of a guide wavelength $\lambda$ of the optical waveguide. In some embodiments, the total path length is an integer multiple m of the guide wavelength $\lambda$ (e.g., total path length=$m\lambda$). Thus, the spacing of the periodically spaced electrodes may be written as $m\lambda/n$, in such embodiments.

Alternatively, according to other embodiments 'periodically spaced' is defined as a spacing between points along an optical path at which a resonant optical signal is maximum (e.g., wave peak points). This definition may coincide with the previous definition for an optical signal that is resonant within the closed path.

In some embodiments, the spacing of the periodically spaced control electrodes is determined by a quantity of the control electrodes. For example, if the total path length around the closed path is $m\lambda$, then four (4) periodically spaced control electrodes may be separated by a periodic spacing of $m\lambda/4$ (e.g., n=4). Further, a 'closed optical path' or equivalently a 'closed loop' is defined in a conventional sense herein to mean that a signal propagating along the path or loop from a point 'A' would eventually return to the point 'A' after traversing an entire length of the path or loop exactly once. Also unless otherwise so identified, all references to wavelength '$\lambda$' herein are specifically to the 'guide wavelength' of the optical waveguide (i.e., $\lambda$=guide wavelength).

In general, the periodically spaced control electrodes are equally spaced around the closed path. However, in some embodiments, an actual number k of control electrodes is less than a number n of control electrodes used to determine the spacing of the control electrodes. For example, the spacing may be based on eight (20) control electrodes so the spacing may be given by $m\lambda/20$. However, several of the electrodes may be omitted from a portion of the closed path such that there are actually only sixteen (16) control electrodes (e.g., k=16). This may be the case when several control electrodes are omitted to allow for coupling into and out of the controllable optical ring resonator, for example. As such, most of the control electrodes are equally spaced except for those adjacent to the 'omitted' control electrodes.

For simplicity herein, no distinction is made between a substrate and any layer or structure on the substrate unless such a distinction is necessary for proper understanding. Additionally, all waveguides described herein are optical waveguides so that omission of the term 'optical' when referring to a 'waveguide' does not change the intended meaning of that being described. Further, as used herein, the article 'a' is intended to have its ordinary meaning in the patent arts, namely 'one or more'. For example, 'a segment' means one or more segments and as such, 'the segment' means 'the segment(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

FIG. 2 illustrates a top view of a controllable optical ring resonator 100 according to an embodiment of the present invention. The controllable optical ring resonator 100 comprises an optical waveguide 110 forming a closed optical path. In various embodiments, the optical waveguide 110 comprises essentially any optical waveguide that may be formed to produce a closed optical path. For example, the optical waveguide 110 may comprise one or more of a ridge waveguide, a reverse ridge waveguide, a slot optical waveguide and a strip optical wave guide, as described above. In some embodiments, the optical waveguide 110 comprises a plurality of segments of optical waveguide arranged as a closed loop.

The controllable optical ring resonator 100 illustrated in FIG. 2 further comprises a plurality of control electrodes 120. The control electrodes 120 are periodically located and spaced apart from one another along the optical waveguide 110. As such, the control electrodes 120 are periodically spaced along the closed optical path provided by the optical waveguide 110. The control electrodes 120 control an optical signal within the optical path of the optical waveguide 110.

In the embodiment illustrated in FIG. 2, the plurality of control electrodes 120 comprises four control electrodes 120, by way of example. Individual control electrodes 120 are spaced apart from one another by a periodic distance of $m\lambda/n$, where $m\lambda$ is a total length of the closed optical path and n equals the number of control electrodes 120 in the plurality of control electrodes. For the four (4) control electrodes 120 illustrated in the embodiment of FIG. 2, the equal periodic spacing or distance is $m\lambda/4$, for example.

Figure 3:
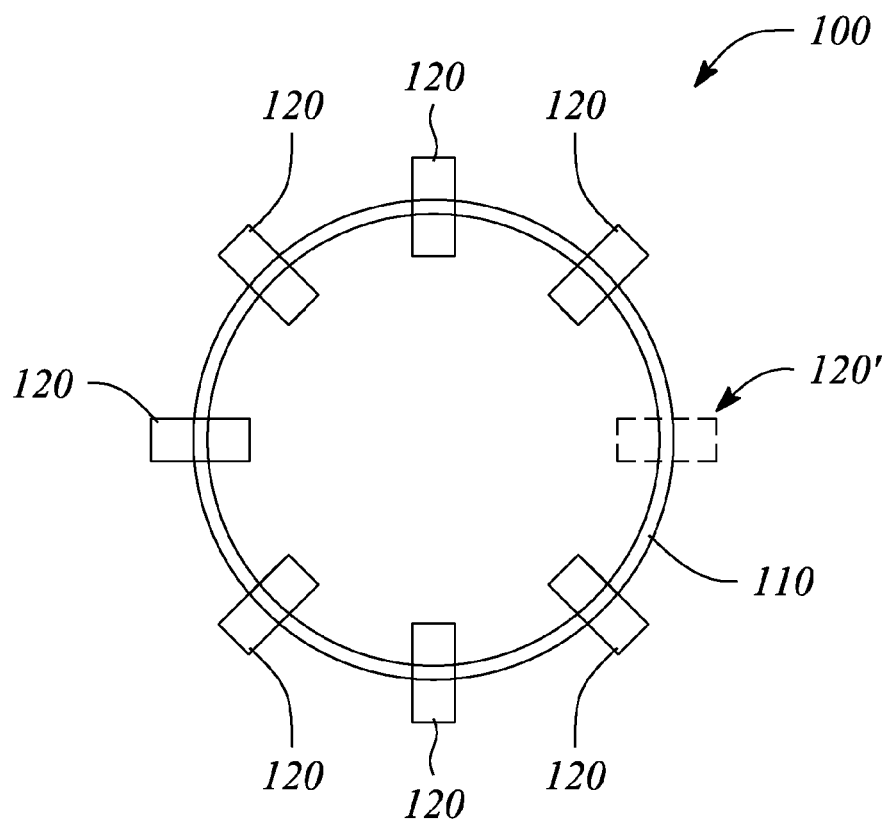
FIG. 3 illustrates a top view of a controllable optical ring resonator according to an embodiment of the present invention.

FIG. 3 illustrates a top view of a controllable optical ring resonator 100 according to an embodiment of the present invention. In particular, FIG. 3 illustrates an exemplary controllable optical ring resonator 100 where an actual number k of control electrodes 120 is less than a number n used to determine the spacing. As illustrated, the spacing $m\lambda/n$ is based on eight (8) control electrodes 120 (i.e., n=8). However, one (1) of the control electrodes 120 is omitted so the actual number k is seven (7) (i.e., k=7). The 'omitted' control electrode 120' is illustrated using a dashed line. Omitting one or more control electrodes 120 may accommodate coupling to an input/output optical waveguide (not illustrated), for example.

In some embodiments, the control electrodes 120 are preferentially located at points along the optical waveguide 110 that correspond to points of maximum optical amplitude (i.e., wave peak points) of a resonant wave of the controllable optical ring resonator 100. Such preferential locating of the control electrodes 120 may increase an effect of the control electrodes 120 on the optical signal, for example. Moreover, when an actual number k of control electrodes 120 is less than a number n used to determine the spacing, the control electrodes 120 may be 'bunched' at selected wave peak points within the controllable optical ring resonator 100, according to some embodiments. In such embodiments (not illustrated), the spacing may not be entirely uniform for all control electrodes 120. However, the control electrodes 120 are still 'periodically spaced' as defined herein by virtue of being located at selected wave peak points.

Figure 4:
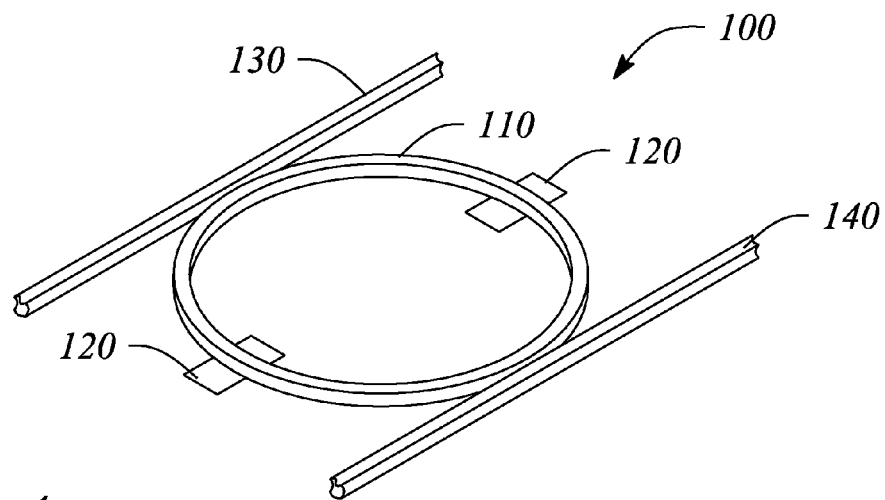
FIG. 4 illustrates a perspective view of another controllable ring resonator according to an embodiment of the present invention.

FIG. 4 illustrates a perspective view of another controllable optical ring resonator 100 according to an embodiment of the present invention. As illustrated in FIG. 4, the controllable optical ring resonator 100 comprises a ring-shaped optical waveguide 110 and two individual control electrodes 120. The two individual control electrodes 120 are periodically spaced around the ring-shaped optical waveguide 110 at a spacing of $m\lambda/2$.

Also illustrated in FIG. 4 are an input optical waveguide segment 130 and an output optical waveguide segment 140. The input optical waveguide segment 130 is adjacent to and optically coupled to the optical waveguide 110. An optical signal propagating in the input waveguide segment 130 may be one or both of coupled into and coupled out of the controllable optical ring resonator 100 depending on a control condition (e.g., bias) of the control electrodes 120. Similarly, the output optical waveguide segment 140 is adjacent to and optically coupled to the optical waveguide 110. The optical signal propagating within the controllable optical ring resonator 100 may be transferred through the optical coupling to the output waveguide segment 140 also depending on a control condition (e.g., bias) of the control electrodes 120.

In some embodiments, each of the control electrodes 120 of the plurality is independently addressable. That is, each of the control electrodes 120 has a separate control input (not illustrated). As such, a different control condition or effect may be elicited from each of the separate control electrodes 120 by application of separate, different control signals to each of the respective control inputs. For example, as illustrated in FIG. 2, a control signal that activates a first control electrode 120 and a third control electrode 120 may be selectively applied while the second and fourth control electrodes 120 may remain inactive.

In general, when activated, the control electrode 120 produces an electro-optic effect within a material of the optical waveguide 110. The produced electro-optic effect influences the optical signal within the optical path to control the optical signal. For example, the electro-optical effect may comprise changing a local refractive index of the material in a vicinity of the activated control electrode 120. An example of an electro-optic effect that changes the local refractive index is carrier plasma dispersion. Another example of an electro-optic effect is an electric field-induced change in the refractive index known generally as the linear Pockels effect. Other examples of an electro-optic effect include, but are not limited to, a quadratic electro-optic or Kerr effect and an elasto-optic effect where the refractive index changes with a deformation of the crystal lattice. Electro-optic effects using electroabsorption such as, but not limited to, the Franz-Keldysh effect and the quantum confined Stark effect may also be employed.

In some embodiments, at least one of the control electrodes 120 comprises a semiconductor junction that intersects a portion of the optical path of the optical waveguide 110. In some of these embodiments, the semiconductor junction may be a p-i-n junction. In other embodiments, the semiconductor junction may be a p-n semiconductor junction (e.g., p-n diode junction). In yet other embodiments, the semiconductor junction may comprise a hetero junction created by particular doping profiles and/or a combination of semiconductor materials.

Figure 5A:
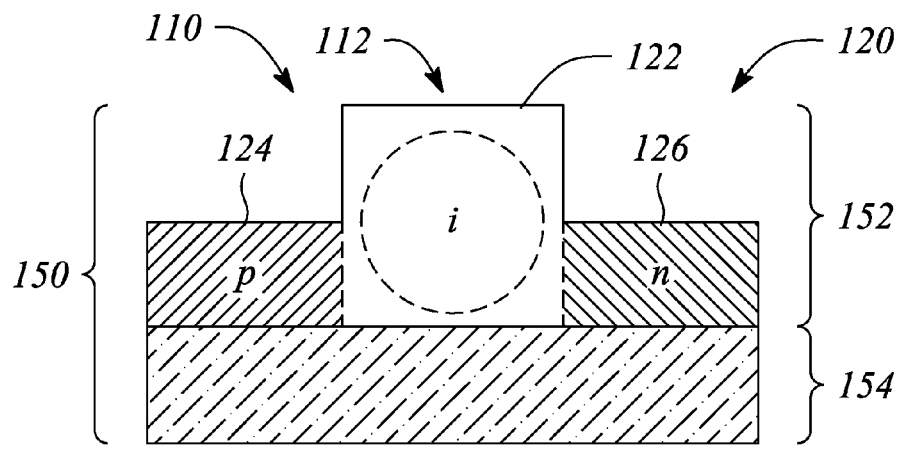
FIG. 5A illustrates a cross sectional view of an exemplary control electrode of a controllable optical ring resonator according to an embodiment of the present invention.

FIG. 5A illustrates a cross sectional view of an exemplary control electrode 120 of the controllable optical ring resonator 100 according to an embodiment of the present invention. In particular, the control electrode 120 illustrated in FIG. 5A comprises a p-i-n semiconductor junction and the optical waveguide 110 comprises a ridge waveguide 110. The p-i-n semiconductor junction-based control electrode 120 and the ridge waveguide 110 are further illustrated as a semiconductor layer 152 on an insulator layer 154 of a semiconductor on insulator (SOI) substrate 150. In some embodiments, another insulator layer (not illustrated) is employed over a top of the ridge waveguide 110 and the control electrode 120.

As illustrated in cross section in FIG. 5A, an intrinsically doped semiconductor portion or i-region 122 of the p-i-n semiconductor junction is collocated with and essentially intersects the optical path of the ridge waveguide 110. A dashed line in FIG. 5A identifies an approximate extent of the optical path within the ridge waveguide 110. A p-doped semiconductor portion or p-region 124 and an n-doped semiconductor portion or n-region 126 of the p-i-n semiconductor junction flank the optical path and the i-region 122 on opposite sides thereof. In this embodiment, the p-i-n semiconductor junction that forms the control electrode 120 is referred to as a transverse or horizontal configuration of the control electrode 120. A vertical configuration of the control electrode (not illustrated) where the p-region and n-region are above and below the optical path may also be employed in some embodiments of the present invention.

For example, the p-i-n semiconductor junction may be formed in a layer 152 of silicon (Si) on an insulating layer 154 of silicon oxide (e.g., $SiO_x$). The p-region 124 may be formed by selectively doping a first area of the Si layer 152 with a p-dopant. The n-region 126 is formed by selectively doping a second area of the Si layer 152 with an n-dopant. The undoped portion of the Si layer 152 lying between the first and second area serves as the i-region 122 of the p-i-n semiconductor junction-based control electrode 120. A ridge 112 of the ridge waveguide 110 may be formed by etching material from the Si layer 152 on either side of the ridge 112 to produce the cross section shape illustrated in FIG. 5A.

In some embodiments, addressing the control electrode 120 may comprise biasing the p-i-n semiconductor junction. For example, biasing may inject free carriers into the i-region 122 to induce free carrier dispersion within the optical path of the optical waveguide 110 in a vicinity of the control electrode 120. Free carrier dispersion essentially alters a refractive index of a material of the optical waveguide 110 in a vicinity of the control electrode 120. In an unbiased condition, such as when the control electrode 120 is not addressed, the i-region 122 functions in a manner similar to essentially any other portion of the optical waveguide 110 beyond the influence a control electrode 120.

Figure 5B:
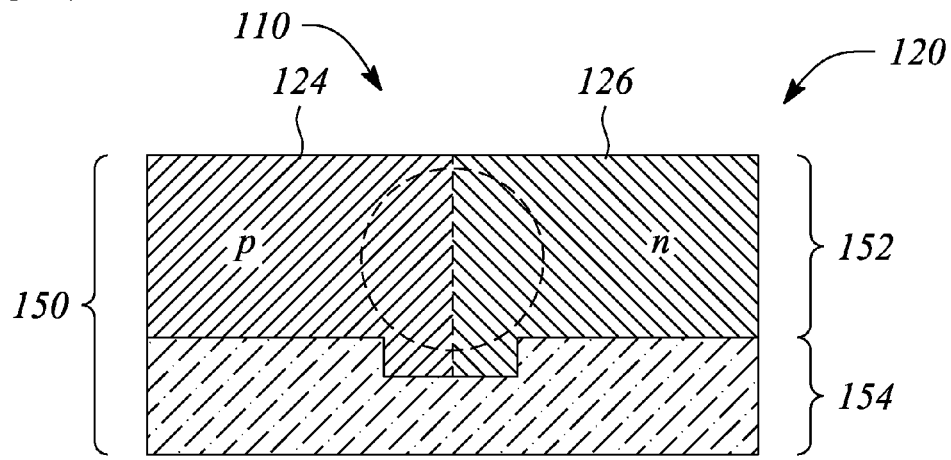
FIG. 5B illustrates a cross sectional view of an exemplary control electrode of a controllable optical ring resonator according to another embodiment of the present invention.

FIG. 5B illustrates a cross sectional view of an exemplary control electrode 120 of the controllable optical ring resonator 100 according to another embodiment of the present invention. In particular, the control electrode 120 illustrated in FIG. 5B comprises a p-n semiconductor junction and the optical waveguide 110 comprises a reverse ridge waveguide 110. In the p-n semiconductor junction, the p-region 124 is in direct contact with the n-region 126. The p-region 124 and the n-region 126 of the p-n semiconductor junction join within the optical path, which is identified by the dashed circle in FIG. 5B in the reverse ridge waveguide 110. The p-n semiconductor junction-based control electrode 120 and the reverse ridge waveguide 110 are further illustrated as a semiconductor layer 152 on an insulator layer 154 of a semiconductor on insulator (SOI) substrate 150. In some embodiments, another insulator layer (not illustrated) is employed over a top of the reverse ridge waveguide 110 and the control electrode 120.

Figure 5C:
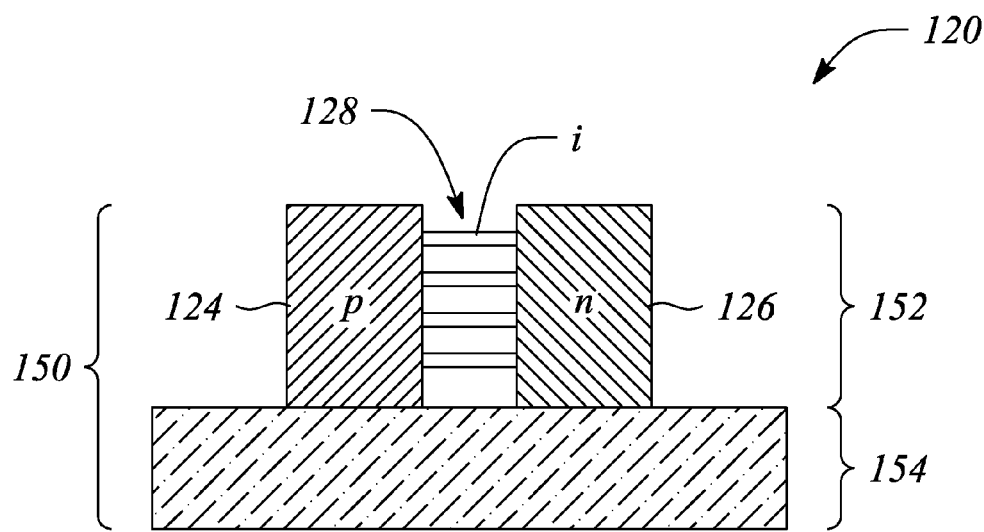
FIG. 5C illustrates a cross sectional view of an exemplary control electrode of a controllable optical ring resonator according to another embodiment of the present invention.

FIG. 5C illustrates a cross sectional view of an exemplary control electrode 120 of the controllable optical ring resonator 100 according to another embodiment of the present invention. In particular, in FIG. 5C the optical waveguide 110 is illustrated as a slot waveguide 110. The control electrode 120 comprises a portion of each of the walls of the slot waveguide and a material that spans a slot between the walls. For example, a first wall (e.g., p-region 124) and a second wall (e.g., n-region 126) of the slot waveguide 110 may comprise p-doped and n-doped Si, respectively. As illustrated, the walls comprise a semiconductor layer 152 supported by an insulator layer 154. The material that spans the slot between the walls is in the form of nanowires 128. The nanowires 128 comprise intrinsically doped Si bridging between the first wall and the second wall to create a p-i-n semiconductor junction-based control electrode 120, for example.

Figure 6:
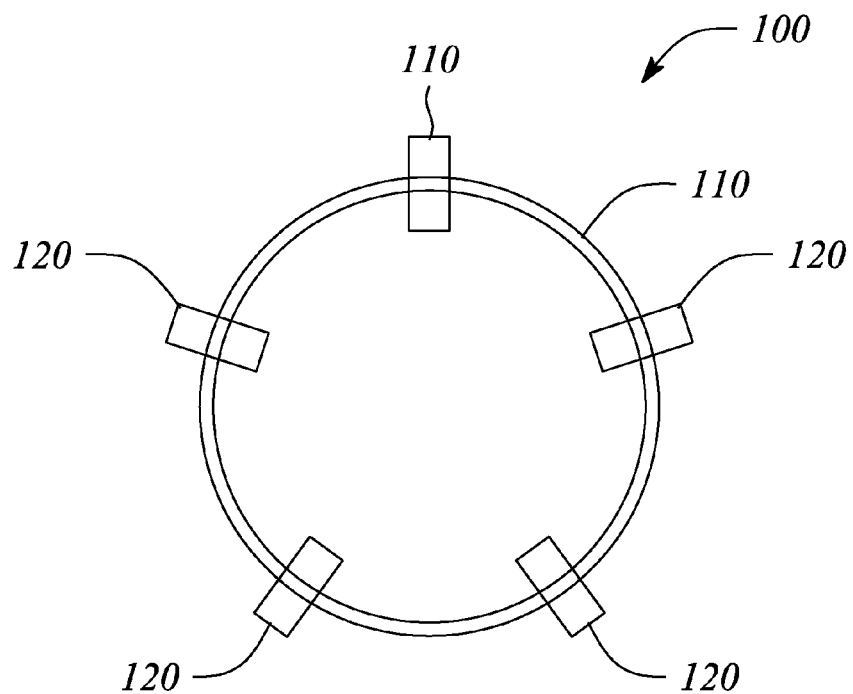
FIG. 6 illustrates a top view of a controllable optical ring resonator according to another embodiment of the present invention.

FIG. 6 illustrates a top view of a controllable optical ring resonator 100 according to another embodiment of the present invention. The controllable optical ring resonator 100 illustrated in FIG. 6 comprises the ring-shaped optical waveguide 110 and five control electrodes 120. The control electrodes 120 are periodically spaced apart from one another by a distance of $\lambda/5$. As mentioned above, the control electrodes 120 provide a rigid ON/OFF control of resonant frequency in the controllable optical ring resonator 100. In addition to the rigid resonant frequency ON/OFF control, the plurality of periodically spaced control electrodes 120 facilitates flexible control at other frequencies. For example, the embodiment of FIG. 6 may be employed to selectively support a fifth harmonic of the resonant frequency of an optical signal having a wavelength of $\lambda$ in the optical waveguide (i.e., $\lambda$=guide wavelength). Supporting the fifth harmonic is an example of a flexible control known as 'mode-locking'

Figure 7:
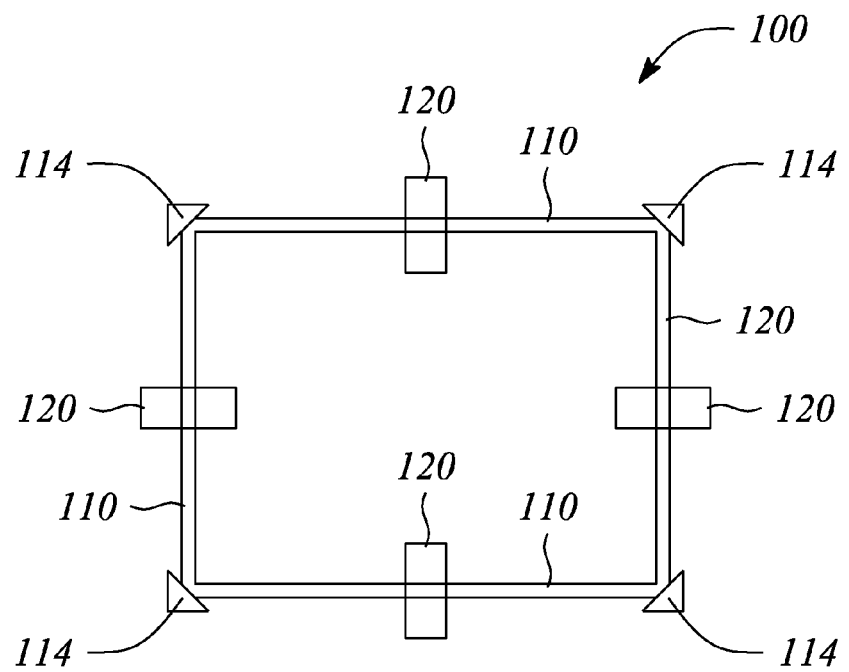
FIG. 7 illustrates a top view of a controllable optical ring resonator according to another embodiment of the present invention.

FIG. 7 illustrates a top view of a controllable optical ring resonator 100 according to another embodiment of the present invention. In particular, the controllable optical ring resonator 100 illustrated in FIG. 7 comprises a plurality of optical waveguide 110 segments (i.e., optical waveguide segments 110). The optical waveguide segments 110 are arranged as a closed loop. In some embodiments, the optical waveguide segments 110 of the plurality comprise substantially straight or linear segments of an optical waveguide. The substantially linear optical waveguide segments 110 are arranged as sides of a closed polygon. The polygon is a simple polygon that is either a convex polygon or a concave polygon, according to various embodiments. The controllable optical ring resonator 100 embodiment illustrated in FIG. 7 comprises four optical waveguide segments 110 that are arranged as four sides of a rectangle representing the closed loop, by way of example. In other embodiments, the closed loop formed by the optical waveguide segments 110 may be represented by essentially any closed polygon having more than two sides including, but not limited to, a triangle, a pentagon, and a hexagon.

The controllable optical ring resonator 100 further comprises an equivalent plurality of total internal reflection (TIR) mirrors 114. The term 'equivalent plurality' herein is defined to mean that a number or quantity of TIR mirrors 114 in the mirror plurality is equivalent to or the same as a number or quantity of optical waveguide segments 110 in the segment plurality. The TIR mirrors 114 connect pairs of optical waveguide segments 110 to one another to form the closed loop. In particular, each TIR mirror 114 connects together adjacent ends of a respective pair of optical waveguide segments 110 to successively close the loop.

The controllable optical ring resonator 100 illustrated in FIG. 7 further comprises a plurality of control electrodes 120. In the embodiment illustrated in FIG. 7, there are four control electrodes 120, one corresponding to each of the four optical waveguide segments 110. While illustrated four control electrodes 120 where a single control electrode 120 is located in each segment 110, other embodiments may have more than one control electrode 120 in each segment 110 provided that the control electrodes 120 are periodically spaced overall around the closed loop of the controllable optical ring resonator 100.

In some embodiments (not illustrated), the controllable optical ring resonator 100 further comprises means for providing electrical isolation between the control electrodes 120. The means for providing electrical isolation essentially confines the control input (e.g., control voltage, injected current, etc.) or an effect thereof to a vicinity or local region of the control electrode 120. In some embodiments, the means for providing electrical isolation may comprise a relatively higher resistance between adjacent control electrodes 120. The relatively higher resistance is higher than the resistance that is present without the means for providing electrical isolation. In other embodiments, the means for providing electrical isolation comprises a much higher resistance (e.g., an open circuit).

In some such embodiments, the means for providing comprises a groove or channel etched in a material separating doped regions of semiconductor layer that makes up the control electrodes 120. For example, a groove may be etched between adjacent p-doped regions of p-n semiconductor junctions as a means for providing electric isolation. In an exemplary embodiment, the etched groove may not completely sever an electrical connection between the adjacent p-doped regions. Instead, the groove may simply increase an electrical resistance of the connection thus providing some electrical isolation. For example, the groove may be etched part way through (e.g., 30%) the p-doped region of the semiconductor layer. The electrical isolation thus provided is such that a vertical resistance is generally lower than a lateral resistance.

In yet other exemplary embodiments, the control electrodes 120 are formed by selectively doping portions of the semiconductor layer. An area between adjacent the control electrodes 120 is left undoped or lightly doped to provide the relatively higher electrical resistance therebetween. In such embodiments, the means for providing electrical isolation comprises the undoped or lightly doped regions between the adjacent control electrodes 120.

Figure 8A:
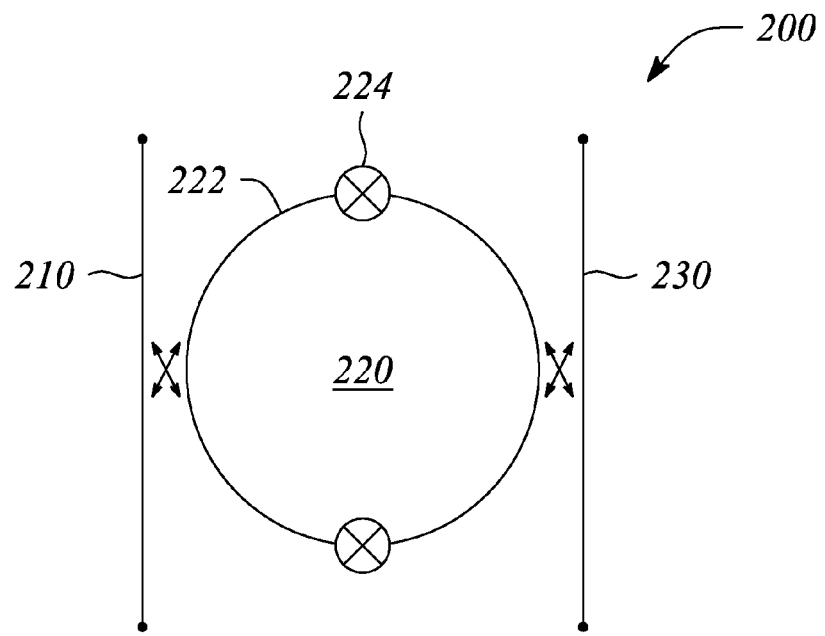
FIG. 8A illustrates a schematic diagram of a photonic system employing a controllable optical ring resonator according to an embodiment of the present invention.

FIG. 8A illustrates a schematic diagram of a photonic system 200 employing a controllable optical ring resonator according to an embodiment of the present invention. The photonic system 200 comprises an input optical waveguide segment 210 and a controllable optical ring resonator 220. The controllable optical ring resonator 220 is adjacent to and optically coupled to the input optical waveguide segment 210.

The controllable optical ring resonator 220 comprises an optical waveguide 222 forming a closed optical path. The controllable optical ring resonator 220 further comprises a plurality of control electrodes 224. The control electrodes 224 of the plurality are periodically located and spaced apart from one another along the optical waveguide 222 (by a distance of $\lambda/n$, as defined above). In various embodiments, the controllable optical ring resonator 220 is essentially similar to the controllable optical ring resonator 100 described above.

In some embodiments, the photonic system 200 further comprises an output optical waveguide segment 230, as illustrated in FIG. 8A. The output optical waveguide segment 230 is adjacent to and optically coupled to the controllable optical ring resonator 220. For example, the output optical waveguide segment 230 may be located on a side of the controllable optical ring resonator 220 opposite that of the input optical waveguide segment 210.

The photonic system 200 employs the controllable optical ring resonator 220 to control an optical performance of the photonic system 200. In particular, the control electrodes 224 control an optical signal within the controllable ring resonator 220. Under the control of the control electrodes 224, the optical signal is coupled one or both of from and to the input optical waveguide 210 relative to the controllable ring resonator 220, in various embodiments. In some embodiments, the optical signal within the controllable optical ring resonator 220 may be coupled to the output optical waveguide segment 230. The embodiment illustrated in FIG. 8A where the optical signal controllably passes from the input optical waveguide segment 210 to the output optical waveguide segment 230 may be employed to realize an optical modulator or switch, for example.

In particular, as an optical modulator or switch, the controllable optical ring resonator 220 may control or regulate whether an input optical signal, or a frequency specific portion thereof, is coupled from the input optical waveguide segment 210 into the controllable optical ring resonator 220. The frequency specific portion of the input optical signal may be determined by a resonant frequency $f_\lambda$ of the controllable optical ring resonator 220, for example. The resonant frequency $f_\lambda$ is, in turn, determined by a total length of the closed optical path $\lambda$ of the controllable optical ring resonator 220. Whether or not the controllable optical ring resonator 220 resonates at the resonant frequency $f_\lambda$ is further determined by a condition of the control electrodes 224.

For example, in some embodiments, when the control electrodes 224 are 'OFF' (e.g., not addressed or not biased), the controllable optical ring resonator 220 resonates at the resonant frequency $f_\lambda$. When the control electrodes 224 are 'ON' (e.g., addressed or biased), the controllable optical ring resonator 220 does not resonate at the resonant frequency $f_\lambda$. Thus, when the control electrodes 224 are 'OFF', the frequency specific portion of the input optical signal that corresponds to the resonant frequency $f_\lambda$ is coupled into the controllable optical ring resonator 220. Also, when the output optical waveguide segment 230 is present, the frequency specific portion of the input optical signal is further coupled out of the controllable optical ring resonator 220. Under such a condition of the control electrodes 224, the optical switch (i.e., the controllable optical ring resonator 220) is essentially 'ON'.

However, when the control electrodes 224 are 'ON', the controllable optical ring resonator 220 does not resonate at the resonant frequency $f_\lambda$ and the frequency specific portion of the input optical signal that corresponds to the resonant frequency $f_\lambda$ is blocked from entering the controllable optical ring resonator 220 by way of the input optical waveguide segment 210. Likewise, the frequency specific portion of the input optical signal does not couple into the output optical waveguide segment 230. Under such a condition of the control electrodes 224, the optical switch (i.e., the controllable optical ring resonator 220) is essentially 'OFF'.

In some embodiments, when the controllable optical ring resonator 220 does not resonate at the resonant frequency $f_\lambda$ due to the control electrodes 224 being 'ON', the controllable optical ring resonator 220 does resonate at another frequency. Consider the example of a photonic system 200 comprising a controllable optical ring resonator 220 that comprises four periodically spaced control electrodes 224. If the four periodically spaced control electrodes 224 are addressed and turned 'ON', the controllable optical ring resonator 220 may resonate at a $4^{th}$ harmonic of the resonant frequency $f_\lambda$. Such $4^{th}$ harmonic resonance may be employed to mode-lock the controllable optical ring resonator 220 at the $4^{th}$ harmonic, for example.

Figure 8B:
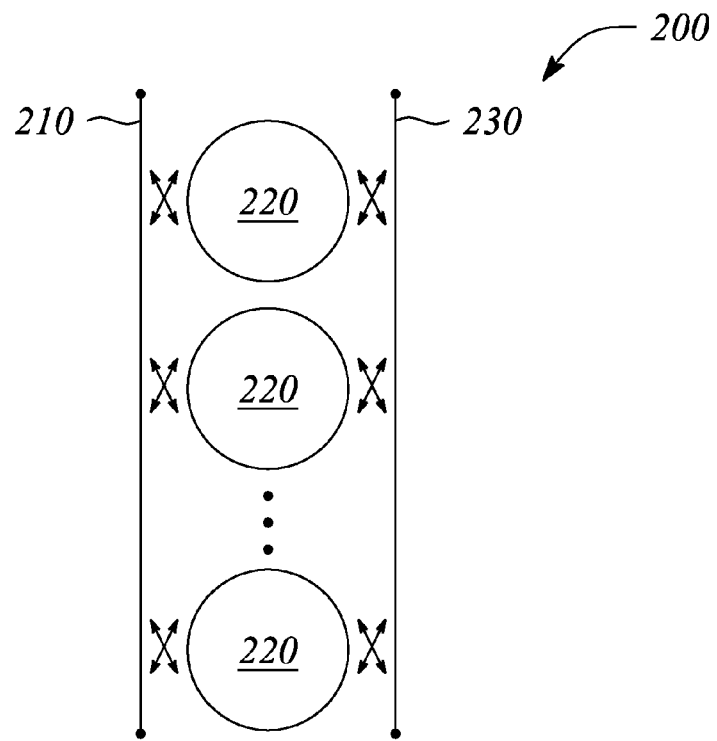
FIG. 8B illustrates a schematic diagram of a photonic system employing a plurality of controllable optical ring resonators according to an embodiment of the present invention.

FIG. 8B illustrates schematic diagram of a photonic system 200 employing a plurality of controllable optical ring resonators according to an embodiment of the present invention. In particular, FIG. 8B illustrates the photonic system 200 comprising an input optical waveguide segment 210, a plurality of individually controllable optical ring resonators 220, and an output optical waveguide segment 230. The individual controllable optical ring resonators 220 are one or both of adjacent to and optically coupled to the input optical waveguide segment 210. Moreover, adjacent ones of the individual controllable optical ring resonators 220 of the plurality are optically coupled together. As illustrated, the individual optical ring resonators 220 are further adjacent to and optically coupled to the output optical waveguide segment 230. The photonic system 200 illustrated in FIG. 8B may be employed to realize a controllable frequency selective switch (or switch/multiplexer) wherein each individual controllable optical ring resonator 220 has a different resonant frequency, for example. In another example, the photonic system 200 illustrated in FIG. 8B may be used to realize a controllable optical filter. In FIG. 8B, the periodically spaced control electrodes of the controllable optical ring resonators 220 have been omitted for clarity of illustration.

Figure 9:
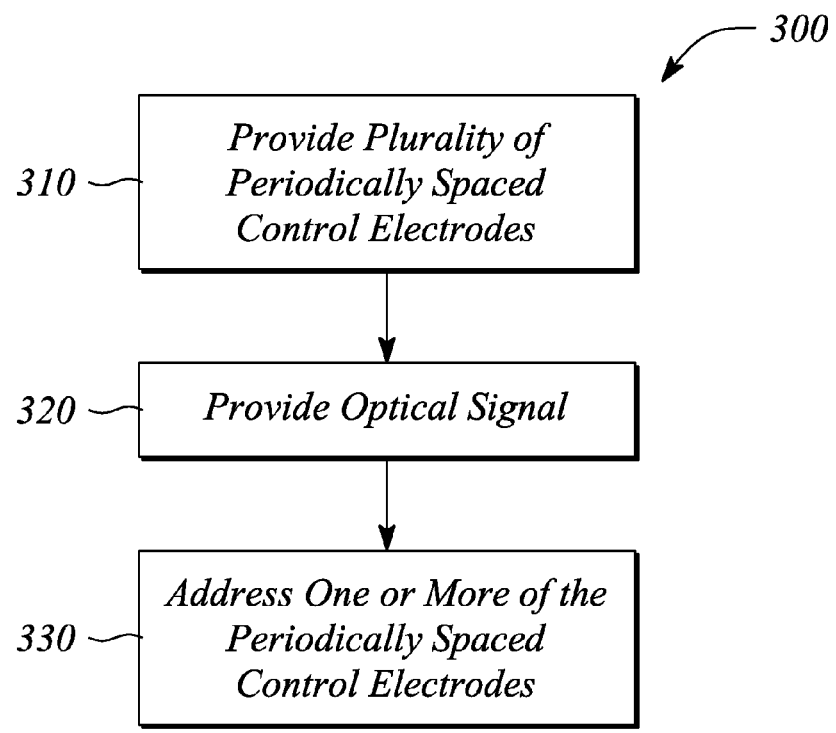
FIG. 9 illustrates a flow chart of a method of controlling an optical ring resonator.

FIG. 9 illustrates a flow chart of a method 300 of controlling an optical ring resonator. The method 300 comprises providing 310 a plurality of control electrodes along an optical path of the optical ring resonator. Providing 310 a plurality of control electrodes comprises periodically spacing the control electrodes along the optical path. The periodic spacing is equal to a total length $\lambda$ of the optical path divided by a number n of the control electrodes in the electrode plurality. The control electrodes and the optical path of the optical ring resonator may be substantially similar to any of the embodiments described above with respect to the controllable optical ring resonator 100.

The method 300 of controlling an optical ring resonator further comprises providing 320 an optical signal within the optical path of the optical ring resonator. Providing 320 an optical signal comprises optically coupling an input optical waveguide segment to the optical ring resonator, and introducing the optical signal into the optical ring resonator via the input optical waveguide segment. The input optical waveguide segment is optically coupled to the optical ring resonator by locating the input optical waveguide segment adjacent to the optical ring resonator, for example.

The method 300 of controlling an optical ring resonator further comprises addressing 330 one or more of the periodically spaced control electrodes. An addressed control electrode interacts with the optical signal. For example, the addressed control electrode may interact with the optical signal by allowing or preventing optical resonance at a resonant frequency of the optical ring resonator.

In some embodiments, at least one of the control electrodes comprises a semiconductor junction that intersects the optical path. In such embodiments, addressing 330 one or more of the control electrodes comprises applying a bias voltage to the semiconductor junction to change a refractive index of a material of the optical path in a vicinity of the semiconductor junction. The control electrodes may be addressed 330 one or more of individually, consecutively, simultaneous and in groups to achieve an effect on one or both of the optical signal and the optical ring resonator.

Thus, there have been described embodiments of a controllable optical ring resonator, a photonic system incorporating the controllable optical ring resonator, and a method of controlling an optical ring resonator employing periodically spaced control electrodes. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A controllable optical ring resonator comprising:
    an optical waveguide having an optical path in a closed loop to support an optical signal optically coupled from an adjacent optical waveguide; and
    a plurality of control electrodes to produce an electro-optic effect that changes a local refractive index in a vicinity of one or more of the control electrodes, the control electrodes being periodically located and spaced apart from one another along the optical waveguide with a gap between adjacent control electrodes that exceeds a width of an adjacent control electrode,
    wherein the control electrodes are to control a resonance characteristic of the optical ring resonator using the change in the local refractive index.

2. The controllable optical ring resonator of claim 1, wherein a control electrode of the plurality comprises a semiconductor junction, the semiconductor junction intersecting a portion of the optical path of the optical waveguide.

3. The controllable optical ring resonator of claim 2, wherein the semiconductor junction is a p-i-n semiconductor junction, an intrinsic region of the p-i-n semiconductor junction intersecting the portion of the optical path.

4. The controllable optical ring resonator of claim 1, wherein the control electrodes are independently addressable to control the resonance characteristic of the optical ring resonator.

5. The controllable optical ring resonator of claim 4, wherein the independent addressability facilitates mode locking of the optical signal.

6. The controllable optical ring resonator of claim 1, wherein the electro-optic effect comprises a carrier plasma dispersion effect that facilitates the change in the local refractive index, the carrier plasma dispersion effect comprising one of injected free carriers into the optical path and extracted free carriers out of the optical path.

7. The controllable optical ring resonator of claim 1, wherein the optical waveguide comprises one or more of a ridge-loaded slab optical waveguide and a reverse ridge-loaded slab optical waveguide.

8. The controllable optical ring resonator of claim 1, wherein the optical waveguide comprises a slot waveguide.

9. The controllable optical ring resonator of claim 1, wherein the optical waveguide comprises a plurality of waveguide segments arranged as the closed loop of the optical path.

10. The controllable optical ring resonator of claim 9, wherein the waveguide segments are connected one to another by total internal reflection (TIR) mirrors.

11. The controllable optical ring resonator of claim 1 used in a photonic system, the photonic system comprising:
the controllable optical ring resonator; and
an input segment of the optical waveguide adjacent to the controllable optical ring resonator, the input segment being the adjacent optical waveguide,
wherein the controllable optical ring resonator is to selectively couple a frequency portion of an optical signal that propagates in the input segment, the coupled frequency portion being the optical signal within the optical path of the controllable optical ring resonator, one or both of the selective coupling and the frequency portion being selectively controlled by the control electrodes of the controllable optical ring resonator.

12. The controllable optical ring resonator of claim 11, wherein the photonic system further comprises an output segment of optical waveguide adjacent to the controllable optical ring resonator and separate from and discontinuous with the input segment, the optical signal within the optical ring resonator being coupled to the output segment, the photonic system being an optical modulator.

13. A photonic system comprising:
an input optical waveguide segment; and
a controllable optical ring resonator adjacent and optically coupled to the input optical waveguide segment, the controllable optical ring resonator comprising:
an optical waveguide forming a closed optical path and a plurality of control electrodes to control a local refractive index in a vicinity of the control electrodes, the control electrodes being periodically located and spaced apart from one another along the optical waveguide and having a gap between adjacent control electrodes that exceeds a width of an adjacent control electrode,
wherein the control electrodes are to control an optical signal that resonates within the controllable optical ring resonator, the optical signal being coupled one or both of from and to the input optical waveguide.

14. The photonic system of claim 13, further comprising:
an output optical waveguide segment adjacent to and optically coupled to the controllable optical ring resonator, the output optical waveguide segment being separate from and discontinuous with the input optical waveguide segment,
wherein the optical signal within the controllable optical ring resonator is coupled to the output optical waveguide segment, the photonic system to facilitate modulation of the optical signal, the modulation being controlled by the control electrodes.

15. The photonic system of claim 13, further comprising a plurality of the controllable optical ring resonators, individual controllable optical ring resonators of the resonator plurality being one or both of adjacent and optically coupled to the input optical waveguide segment and adjacent and optically coupled to other individual controllable optical ring resonators of the resonator plurality.

16. The photonic system of claim 13, wherein a control electrode of the electrode plurality comprises a semiconductor junction that intersects an optical path of the optical signal within the controllable optical ring resonator.

17. The photonic system of claim 13, wherein the optical waveguide comprises one or more of a ridge-loaded slab optical waveguide, a reverse ridge-loaded slab optical waveguide and a slot waveguide.

18. A method of controlling an optical ring resonator, the method comprising:
providing a plurality of control electrodes periodically spaced along an optical path of the optical ring resonator;
providing an optical signal within the optical path of the optical ring resonator by optically coupling the optical signal into the optical path from an adjacent optical waveguide; and
addressing one or more of the control electrodes to induce an electro-optic effect that changes a local refractive index in a vicinity of the addressed control electrode,
wherein the addressed control electrode interacts with the optical signal within the optical path using the change in the local refractive index.

19. The method of claim 18, wherein at least one of the control electrodes comprises a semiconductor junction that intersects the optical path, and wherein addressing one or more of the control electrodes comprises applying a bias voltage to the semiconductor junction to change the local refractive index.

20. The method of claim 18, wherein the electro-optic effect comprises a carrier plasma dispersion effect that one of injects free carriers into the optical path and extracts free carriers out of the optical path to change the local refractive index.

\* \* \* \* \*